(12) United States Patent
Yang et al.

(10) Patent No.: US 8,776,983 B2
(45) Date of Patent: Jul. 15, 2014

(54) TURNTABLE DEVICE FOR SUBSTRATE AND SUBSTRATE TRANSPORTING SYSTEM

(75) Inventors: Weibing Yang, Guandong (CN); Chunhao Wu, Guandong (CN); Kunhsien Lin, Guandong (CN); Yongqiang Wang, Guandong (CN); Zhiyou Shu, Guandong (CN); Xiande Li, Guandong (CN); Minghu Qi, Guandong (CN); Zenghong Chen, Guandong (CN); Zhenhua Guo, Guandong (CN); Yunshao Jiang, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 100 days.

(21) Appl. No.: 13/574,603

(22) PCT Filed: Jun. 28, 2012

(86) PCT No.: PCT/CN2012/077687
§ 371 (c)(1),
(2), (4) Date: Jul. 21, 2012

(87) PCT Pub. No.: WO2014/000199
PCT Pub. Date: Jan. 3, 2014

(65) Prior Publication Data
US 2013/0341158 A1    Dec. 26, 2013

(30) Foreign Application Priority Data
Jun. 26, 2012  (CN) .......................... 2012 1 0213278

(51) Int. Cl.
*B65G 29/00*    (2006.01)

(52) U.S. Cl.
USPC ......................................................... 198/412

(58) Field of Classification Search
USPC ..................... 198/370.09, 412, 414
See application file for complete search history.

(56) References Cited

U.S. PATENT DOCUMENTS

| | | | | | |
|---|---|---|---|---|---|
| 3,595,370 | A | * | 7/1971 | Fujishiro | 198/374 |
| 4,344,727 | A | * | 8/1982 | Chaloupka | 414/789.1 |
| 4,421,221 | A | * | 12/1983 | Pessina et al. | 198/369.1 |
| 4,730,718 | A | * | 3/1988 | Fazio et al. | 198/370.1 |
| 4,860,879 | A | * | 8/1989 | Harsch et al. | 198/395 |
| 5,141,095 | A | * | 8/1992 | Kamp | 198/409 |
| 5,165,516 | A | * | 11/1992 | Reed et al. | 198/370.1 |
| 5,450,940 | A | * | 9/1995 | Rathert et al. | 198/412 |
| 5,469,954 | A | * | 11/1995 | Rathert et al. | 198/412 |
| 5,609,236 | A | * | 3/1997 | Neukam | 198/370.1 |
| 5,699,892 | A | * | 12/1997 | Shyr et al. | 198/370.09 |

(Continued)

*Primary Examiner* — Douglas Hess
(74) *Attorney, Agent, or Firm* — Andrew C. Cheng

(57) ABSTRACT

The present invention provides a turntable and a substrate transporting system. The turntable includes an interconnecting device and a transporting platform which is moved by the interconnecting device in a way that the transporting platform is docked to a substrate exporting apparatus or importing apparatus, alternatively. Wherein the transporting platform picks up the glass substrate from the substrate exporting apparatus when docked thereto, and then transporting the substrate horizontally to the substrate importing apparatus in which the glass substrate is delivered as the transporting device is articulated thereto. The turntable device made in accordance with the present invention is properly arranged with a transporting platform to pick up, displace, and finally deliver the substrate. Since all these operations are streamlined, as a result, no waiting area is needed so as to effectively reduce the area for establishing the production line.

12 Claims, 2 Drawing Sheets

(56) References Cited

U.S. PATENT DOCUMENTS

| | | | |
|---|---|---|---|
| 5,967,292 A * | 10/1999 | Corrales | 198/411 |
| 6,223,880 B1 * | 5/2001 | Caspi et al. | 198/346.2 |
| 6,308,818 B1 * | 10/2001 | Bonora et al. | 198/465.1 |
| 6,343,685 B1 * | 2/2002 | Hofer | 198/370.09 |
| 6,378,690 B1 * | 4/2002 | Pessina et al. | 198/414 |
| 6,464,064 B1 * | 10/2002 | Rieg et al. | 198/370.09 |
| 6,581,749 B2 * | 6/2003 | Wood et al. | 198/370.09 |
| 6,866,139 B1 * | 3/2005 | Lawless et al. | 198/782 |
| 6,966,743 B2 * | 11/2005 | Eugster | 414/790.3 |
| 7,077,620 B2 * | 7/2006 | Ishioka | 414/749.1 |
| 7,766,298 B2 * | 8/2010 | Chang et al. | 248/424 |
| 7,909,156 B2 * | 3/2011 | Wen | 198/403 |
| 7,971,536 B2 * | 7/2011 | Sugimoto | 104/48 |
| 8,061,500 B2 * | 11/2011 | Baccini | 198/345.1 |
| 8,181,767 B2 * | 5/2012 | Gales et al. | 198/404 |
| 8,312,981 B2 * | 11/2012 | Franz | 198/370.09 |
| 8,327,997 B2 * | 12/2012 | Hamao et al. | 198/379 |
| 8,550,228 B1 * | 10/2013 | Wei et al. | 198/412 |
| 8,590,691 B2 * | 11/2013 | Muller | 198/370.01 |

* cited by examiner

TURNTABLE DEVICE FOR SUBSTRATE AND SUBSTRATE TRANSPORTING SYSTEM

FIELD OF THE INVENTION

The present invention relates to a turntable device for substrate and substrate transportation system, and more particularly, to a turntable and transportation system for manufacturing of liquid crystal display device.

DESCRIPTION OF PRIOR ART

In the manufacturing process of a liquid crystal display device, a turntable device for glass has to be used to transfer a glass substrate from an automatic storage system to a workstation on a production line, and then to perform all necessary works thereon.

In an existing or prior art turntable device for substrate, it generally includes a chassis and a rotating table supported onto the chassis, a supporting bracket, a first horizontal displacing device, and a pick-and-place arm. The rotating table is arranged between the chassis and the supporting bracket. The pick-and-place arm is installed to the supporting bracket by means of the first horizontal displacing device. The first horizontal displacing device can move vertically along the supporting bracket so as to adjust the working level of a vertical displacing device. The first horizontal displacing device further moves the pick-and-place arm toward and away from the rotating table.

During the operation of the turntable, the automatic storage system has to leave or provide a waiting area for the glass substrate to be picked up, and which is a space with at least a width of the glass substrate. Then, the working level of the first horizontal displacing device is adjusted with respect to the vertical displacing device such that the working level of the pick-and-place arm is reached. Then, the first horizontal displacing device is extended in a way that the pick-and-place arm is moved under the waiting area for glass substrate, and then the first horizontal displacing device is elevated with respect to the vertical displacing device such that the glass substrate is lifted up. Afterward, the first horizontal displacing device and the rotating table is retrieved, and the rotating table is rotated such that the first horizontal displacing device, the pick-and-place arm along with the glass substrate thereon are all rotated 180 degrees along with the rotating table. Then, the first horizontal displacing device is extended again to a disposing area on the production line, and the first horizontal displacing device is lowered with respect to the vertical displacing device. The pick-and-place arm is then lowered and the glass substrate is placed and supported onto the production line. Lastly, the first horizontal displacing device is retracted and the pick-and-place arm is retrieved from a position below the glass substrate.

Nevertheless, the provision of the waiting area will only increase the working space of the factory.

SUMMARY OF THE INVENTION

It is a purpose of the present invention to provide a turntable device for glass substrate and a substrate transportation system in which the waiting space for substrate can be reduced.

In order to resolve the prior art problems, the present invention provides a technical solution by introducing a turntable device for a glass substrate arranged between a substrate exporting apparatus and substrate importing apparatus, characterized in that the turntable includes an interconnecting device and a transporting platform which is moved by the interconnecting device in a way that the transporting platform is articulated to the substrate exporting apparatus or importing apparatus, alternatively. Wherein the transporting platform receives the glass substrate from the substrate exporting apparatus when stationed thereto, and then transporting the substrate horizontally to the substrate importing apparatus in which the glass substrate is delivered when the transporting device is stationed thereto; the interconnecting device including a vertical displacing device and a first horizontal displacing device with which the transporting platform can be moved vertically and horizontally. Wherein the first horizontal displacing device includes a screw disposed on the vertical displacing device, and a nut enveloped onto the screw and mounted onto the transporting platform; wherein the transporting platform includes a base, and a plurality of transaxles rotationally arranged along the first horizontal direction over a surface of the base.

Wherein the transporting platform further includes a plurality of rollers arranged onto each of the transaxles.

Wherein the transporting platform further includes a driving device for driving the transaxles.

Wherein the interconnecting device further includes a rotating device on which the transporting table can be rotated centered on a vertical axis.

Wherein the interconnecting device further includes a second horizontal displacing device with which the transporting platform can be moved along a second horizontal direction which is perpendicular to the first horizontal direction.

In order to resolve the prior art problems, the present invention provides a technical solution by introducing a turntable device arranged between a substrate exporting apparatus and substrate importing apparatus, characterized in that the turntable includes an interconnecting device and a transporting platform which is moved by the interconnecting device in a way that the transporting platform is stationed to the substrate exporting apparatus or importing apparatus, alternatively. Wherein the transporting platform receives the glass substrate from the substrate exporting apparatus when stationed thereto, and then transporting the substrate horizontally to the substrate importing apparatus in which the glass substrate is delivered when the transporting device is articulated thereto.

Wherein the interconnecting device includes a vertical displacing device and a first horizontal displacing device with which the transporting platform can be moved vertically and horizontally.

Wherein the first horizontal displacing device includes a screw disposed on the vertical displacing device, and a nut enveloped onto the screw and mounted onto the transporting platform; wherein the transporting platform includes a base, and a plurality of transaxles rotationally arranged over a surface of the base.

Wherein the transporting platform includes a base, and a plurality of transaxles rotationally arranged along the first horizontal direction over a surface of the base.

Wherein the transporting platform further includes a plurality of rollers arranged onto each of the transaxles.

Wherein the transporting platform further includes a driving device for driving the transaxles.

Wherein the interconnecting device further includes a rotating device on which the transporting table can be rotated centered on a vertical axis.

Wherein the interconnecting device further includes a second horizontal displacing device with which the transporting platform can be moved along a second horizontal direction which is perpendicular to the first horizontal direction.

In order to resolve the prior art problems, the present invention provides a technical solution by introducing a substrate transporting system, characterized in that the substrate transporting system includes a substrate exporting device, a substrate importing device, and a turntable device arranged between the substrate exporting device and substrate importing device. Wherein that the turntable includes an interconnecting device and a transporting platform which is moved by the interconnecting device in a way that the transporting platform is stationed to the substrate exporting apparatus or importing apparatus, alternatively. Wherein the transporting platform receives the glass substrate from the substrate exporting apparatus when stationed thereto, and then transporting the substrate horizontally to the substrate importing apparatus in which the glass substrate is delivered when the transporting device is articulated thereto.

Wherein the interconnecting device includes a vertical displacing device, a first horizontal displacing device, a rotating table, and a second horizontal displacing device. Wherein the transporting platform is moved vertically by the vertical displacing device, and along the first horizontal direction by the first horizontal displacing device. Wherein the transporting platform is rotated by the rotating device; and wherein the transporting platform is moved along the second horizontal direction which is perpendicular to the first horizontal direction by the second horizontal displacing device.

The present invention can be concluded with the following advantages: as compared with the existing prior art, the turntable device made in accordance with the present invention is incorporated with a transporting platform which can readily picks up a glass substrate, displacing it, and then delivered the glass substrate to an intended area. Since there is no waiting area needed in the substrate exporting apparatus, the provision of the present invention can readily reduce the overall area for setting up a production line of the liquid crystal display device.

DETAILED DESCRIPTION OF PREFERRED EMBODIMENT

Detailed description to the preferred embodiment of the present invention will be given along with the accompanied drawings.

Figure 1:
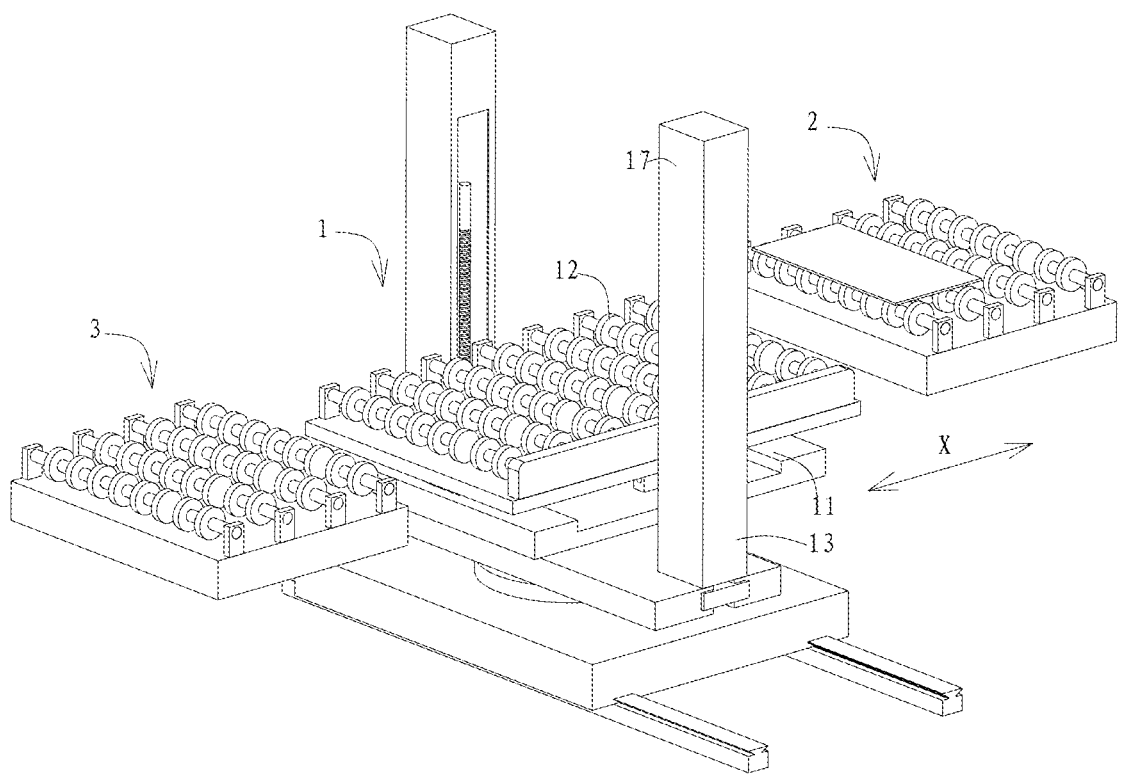
FIG. 1 is a perspective view of a substrate transportation system made in accordance with the present invention.

Referring to FIG. 1, the turntable device 1 made in accordance with the present invention is arranged between an substrate exporting apparatus 2, and a substrate import apparatus 3. The turntable device 1 includes an interconnecting device 11, and a transporting platform 12.

The interconnecting device 11 is used to drive the transporting platform 12 such that the transporting platform 12 can be selectively stationed to the substrate exporting apparatus 2 or the substrate importing apparatus 3. When the transporting platform 2 is stationed to the substrate exporting apparatus 2, the transporting platform 2 receives a glass substrate 4, and then is driven to move along the horizontal direction with the glass substrate 4 carried thereon. After the transporting platform 2 is stationed to the substrate importing apparatus 3, then the glass substrate 4 is placed or delivered thereto.

The substrate exporting apparatus 2 is generally interlinked to an automatic storage (not shown and disclosed in Figures) and is used to retrieve a glass substrate 4 from a cartridge (not shown in the Figures), and then delivered to the turntable device 1. The procedures of the substrate exporting apparatus 2 to deliver the glass substrate 4 are as follow. The vertical level and horizontal position of the transporting platform 11 of the turntable device 1 are adjusted through the interconnecting device 11 such that the turntable device 1 is stationed onto the substrate exporting apparatus 2. Once the turntable device 1 is stationed to the substrate exporting apparatus 2, the transporting platform will receives the substrate 4 therefrom, and then displace the substrate 4 along the first horizontal direction X until the substrate 4 is fully supported by the transporting platform 12.

The substrate importing apparatus 3 is generally arranged in upstream of the production line (not shown in Figures). The substrate importing apparatus 3 is used to receive the glass substrate 4 delivered from the transporting device 12, and then transport the substrate 4 to further workstation. The substrate 4 carried by the transporting platform 12 of the turntable device 1 will be delivered to the substrate importing apparatus 3 through the following steps. Again, the vertical level and horizontal position of the transporting platform 12 will be adjusted by the interconnecting device 11 such that the transporting device 11 is stationed to the substrate importing apparatus 3. The transporting platform 12 will further move the substrate 4 along the first horizontal direction X till the substrate 4 is completely away from the transporting platform 12 and eventually received and supported by the substrate importing apparatus 3.

Figure 2:
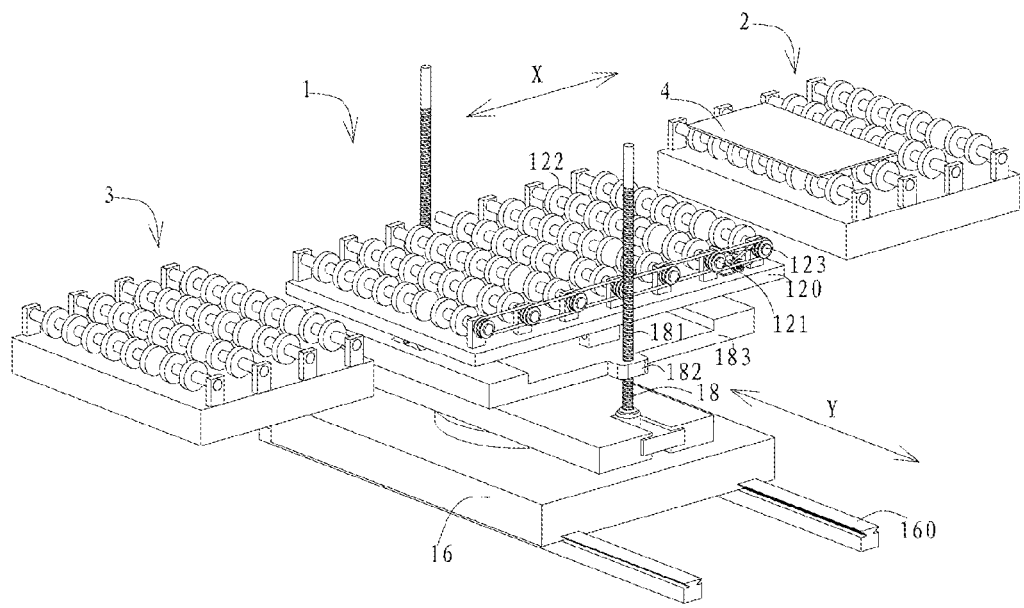
FIG. 2 is a perspective view of the substrate transportation system shown in FIG. 1 with the supporting bracket removed for simplicity.

Referring to FIG. 2, the transporting platform 12 includes a base 120, and a plurality of transaxles 121 which are arranged across a surface of the base 120 along the first horizontal direction X and spaced from each other. Each of the transaxles 121 is arranged with a plurality of rollers 122 synchronized with the corresponding transaxle 121. Each of the transaxles 121 has the same diameter, and each of the rollers 122 has the same diameter as well. The substrate 4 can be fully supported by the rollers 122. In order to ensure the substrate 4 can be smoothly and stably transferred, the transporting platform 12 further includes a driving device 13 which can synchronically rotate the transaxles 121 to ensure the substrate 4 is applied with same driving force from each of the transaxles 121 through the rollers 122.

Figure 3:
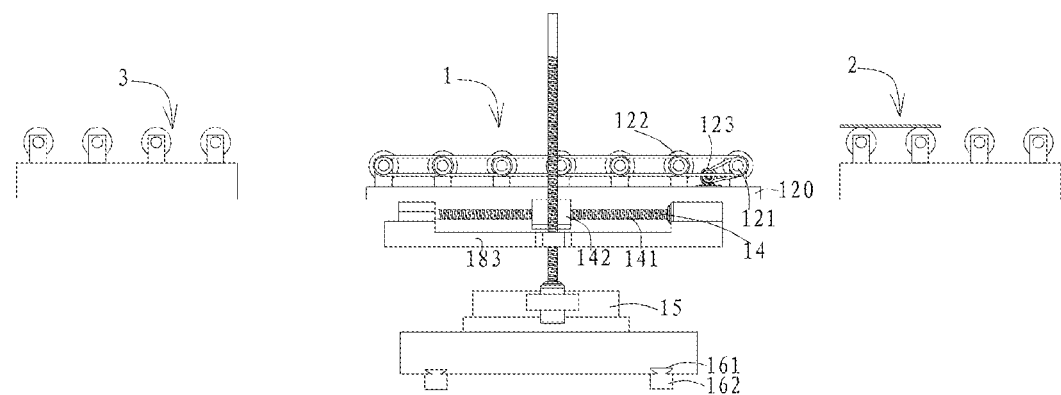
FIG. 3 is a front elevational view of the transportation system shown in FIG. 2.

Referring to FIGS. 2 and 3, in this embodiment, the interconnecting device 11 includes a vertical displacing device 13, and a first horizontal displacing device 14. The transporting platform 12 can be moved along vertical direction by the vertical displacing device 13, and the transporting platform 12 can be moved along the first horizontal direction X by the first horizontal displacing device 14.

The vertical displacing device 13 includes a pair of supporting bracket 17, and a level adjusting device 18 mounted onto the supporting bracket 17. The level adjusting device 18 is a screw and nut mechanism, and it includes a screw 181 mounted onto the supporting bracket 17, and a nut 182 enveloped onto the screw 18, and a supporting platform 183. The nuts 182 are integrally mounted onto sides of the supporting platform 183, respectively. The supporting platform 183 is coupled to the transporting platform 12. In the field application, the vertical displacing device 13 can be any adjusting mechanism capable of making adjustment of the level of the transporting platform 12, for example, a hydraulic cylinder can be used to serve the purpose.

The first horizontal displacing device 14 includes a screw 141 extending along the first horizontal direction X and mounted onto the vertical displacing device 13, and a nut 142 enveloped onto the screw 141 and mounted onto the transporting platform 12. Substantially, the screw 141 is mounted onto a center top position of the supporting platform 183, and the nut 142 is mounted onto the bottom center of the base 120 of the transporting platform 120.

In field application, the first horizontal displacing device 14 can be embodied as a slot (not shown in Figures) arranged onto one of the transporting platform 12 and the vertical displacing device 13, and a rail (not shown in Figures) arranged onto the other of the transporting platform 12 and the vertical displacing device 13. Alternatively, the first horizontal displacing device can be embodied as a chain or any interlinking mechanism.

The interconnecting device 11 further includes a rotating device 15 which is rotationally supporting the vertical displacing device 13 from below. The vertical displacing device 13, the first horizontal displacing device 14, and the transporting platform 12 can be rotated synchronically by the rotating device 15. In this embodiment, a vertical rotating shaft is a rotating center of the rotating device 15.

The provision of the rotating device 15 can expand the utilization of the turntable device 1 to a certain degree. Substantially, when the operating direction of both the substrate exporting apparatus 2 and the substrate importing device 3 is aligned with the first horizontal direction X, then either the turntable device 1 can readily rotate the substrate 4 without the operation of the rotating device 15, or rotating the substrate 4 180 degrees with the operation of the rotating device 15. Meanwhile, when the operating directions of both the substrate exporting apparatus 2 and the substrate importing device 3 are arranged with a certain angle, for example, a 90 degrees is formed therebetween, then the turntable device 1 can be rotated 90 or 270 degrees to rotate the substrate 4.

The interconnecting device 11 further includes a Second horizontal displacing device 16. The transporting platform 12 can be moved by the second horizontal displacing device 16 along the second horizontal direction Y, which is perpendicular to the first horizontal direction.

The second horizontal displacing device 16 includes a sliding platform 160 mounted under the rotating device 15, and on which a pair of sliding slots 161 is defined, and a pair of rails 162 arranged along a second horizontal direction Y and capable of coupling with the sliding slot 161. When the substrate exporting device 2 is going to deliver the substrate 4 from different positions along the second horizontal direction Y, then the second horizontal displacing device 16 can be used to adjust the transporting platform 12 along the second horizontal direction Y in different positions so as to have the transporting platform 12 properly receive the substrate 4 from the substrate exporting apparatus 2 after the transporting platform 12 is properly stationed to the substrate exporting apparatus 2. Afterward, the second horizontal displacing device 16 can be used again to adjust the transporting platform 12 along the second horizontal direction Y in a way that the transporting platform 12 can be aligned and stationed with the substrate importing apparatus 3 such that the substrate 4 carried by the transporting platform 12 can be properly delivered thereto.

The present invention can be concluded with the following advantages: as compared with the existing prior art, the turntable device 1 made in accordance with the present invention is incorporated with a transporting platform 12 which can readily picks up a glass substrate 4, displacing it, and then delivered the glass substrate 4 to an intended area. Since no waiting area in the substrate exporting apparatus 2 is needed, the provision of the present invention can readily reduce the overall area for setting up a production line of the liquid crystal display device.

The present invention further provides a substrate transporting system. This substrate transporting system includes a substrate exporting apparatus 2, a substrate importing apparatus 3, and a turntable device 1 coordinated between the substrate exporting device 2 and the substrate importing apparatus 3. The turntable device 1 includes an interconnecting device 11 and a transporting platform 12 which can be driven by the interconnecting device 11 such that the transporting platform 12 can be readily stationed with the substrate exporting apparatus 2 and the substrate importing apparatus 3, respectively and selectively. When the transporting platform 12 is stationed to the substrate exporting apparatus 2, a substrate 4 from the substrate exporting apparatus 2 can be transferred by the transporting platform 12. The transporting platform 12 is then driven to move to the substrate importing apparatus 3, and the substrate 4 carried thereon is then delivered to the substrate importing apparatus 3 once the transporting platform 12 is stationed thereto.

Since the interconnecting device 11 of the turntable device 1 has been detailedly described above, as a result, no detailed description is given herebelow.

Embodiments of the present invention have been described, but not intending to impose any unduly constraint to the appended claims. Any modification of equivalent structure or equivalent process made according to the disclosure and drawings of the present invention, or any application thereof; directly or indirectly, to other related fields of technique, is considered encompassed in the scope of protection defined by the clams of the present invention.

The invention claimed is:

1. A turntable device for a glass substrate arranged between a substrate exporting apparatus and substrate importing apparatus, characterized in that the turntable includes an interconnecting device and a transporting platform which is moved by the interconnecting device in a way that the transporting platform is articulated to the substrate exporting apparatus or importing apparatus, alternatively, wherein the transporting platform receives the glass substrate from the substrate exporting apparatus when stationed thereto, and then transporting the substrate horizontally to the substrate importing apparatus in which the glass substrate is delivered when the transporting device is stationed thereto; the interconnecting device including a vertical displacing device and a first horizontal displacing device with which the transporting platform can be moved vertically and horizontally; wherein the first horizontal displacing device includes a screw disposed on the vertical displacing device, and a nut enveloped onto the screw and mounted onto the transporting platform; wherein the transporting platform includes a base, and a plurality of transaxles rotationally arranged along the first horizontal direction over a surface of the base.

2. The turntable as recited in claim 1, characterized in that the transporting platform further includes a plurality of rollers arranged onto each of the transaxles.

3. The turntable as recited in claim 2, characterized in that the transporting platform further includes a driving device for driving the transaxles.

4. The turntable as recited in claim 1, characterized in that the interconnecting device further includes a rotating device on which the transporting table can be rotated centered on a vertical axis.

5. The turntable as recited in claim 4, characterized in that the interconnecting device further includes a second horizontal displacing device with which the transporting platform can be moved along a second horizontal direction which is perpendicular to the first horizontal direction.

6. A turntable device arranged between a substrate exporting apparatus and substrate importing apparatus, characterized in that the turntable includes an interconnecting device and a transporting platform which is moved by the interconnecting device in a way that the transporting platform is stationed to the substrate exporting apparatus or importing apparatus, alternatively; wherein the transporting platform receives the glass substrate from the substrate exporting apparatus when stationed thereto, and then transporting the substrate horizontally to the substrate importing apparatus in which the glass substrate is delivered when the transporting device is articulated thereto;

wherein the interconnecting device includes a vertical displacing device and a first horizontal displacing device with which the transporting platform can be moved vertically and horizontally; and wherein the first horizontal displacing device includes a screw disposed on the vertical displacing device, and a nut enveloped onto the screw and mounted onto the transporting platform; wherein the transporting platform includes a base, and a plurality of transaxles rotationally arranged over a surface of the base.

7. The turntable as recited in claim 6, wherein the transporting platform includes a base, and a plurality of transaxles rotationally arranged along the first horizontal direction over a surface of the base.

8. The turntable as recited in claim 7, characterized in that the transporting platform further includes a plurality of rollers arranged onto each of the transaxles.

9. The turntable as recited in claim 8, characterized in that the transporting platform further includes a driving device for driving the transaxles.

10. The turntable as recited in claim 6, characterized in that the interconnecting device further includes a rotating device on which the transporting table can be rotated centered on a vertical axis.

11. The turntable as recited in claim 10, characterized in that the interconnecting device further includes a second horizontal displacing device with which the transporting platform can be moved along a second horizontal direction which is perpendicular to the first horizontal direction.

12. A substrate transporting system, characterized in that the substrate transporting system includes a substrate exporting device, a substrate importing device, and a turntable device arranged between the substrate exporting device and substrate importing device, wherein that the turntable includes an interconnecting device and a transporting platform which is moved by the interconnecting device in a way that the transporting platform is stationed to the substrate exporting apparatus or importing apparatus, alternatively; wherein the transporting platform receives the glass substrate from the substrate exporting apparatus when stationed thereto, and then transporting the substrate horizontally to the substrate importing apparatus in which the glass substrate is delivered when the transporting device is articulated thereto; and wherein the interconnecting device includes a vertical displacing device, a first horizontal displacing device, which includes a screw disposed on the vertical displacing device, and a nut enveloped onto the screw and mounted onto the transporting platform, a rotating table, and a second horizontal displacing device, wherein the transporting platform is moved vertically by the vertical displacing device, and along the first horizontal direction by the first horizontal displacing device; wherein the transporting platform is rotated by the rotating device; wherein the transporting platform is moved along the second horizontal direction which is perpendicular to the first horizontal direction by the second horizontal displacing device.

* * * * *